(12) United States Patent
Chadwick

(10) Patent No.: US 10,565,620 B1
(45) Date of Patent: *Feb. 18, 2020

(54) AUDIENCE MATCHING SYSTEM FOR SERVING ADVERTISEMENTS TO DISPLAYS

(71) Applicant: Vistar Media Inc., New York, NY (US)

(72) Inventor: Mark Chadwick, Philadelphia, PA (US)

(73) Assignee: Vistar Media Inc., New York, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 14/717,952

(22) Filed: May 20, 2015

Related U.S. Application Data

(60) Provisional application No. 62/038,739, filed on Aug. 18, 2014, provisional application No. 62/001,238, filed on May 21, 2014.

(51) Int. Cl.
  *G06Q 30/02* (2012.01)
(52) U.S. Cl.
  CPC ..... *G06Q 30/0261* (2013.01); *G06Q 30/0205* (2013.01); *G06Q 30/0269* (2013.01)
(58) Field of Classification Search
  None
  See application file for complete search history.

(56) References Cited

U.S. PATENT DOCUMENTS

| 7,886,047 B1* | 2/2011 | Potluri | H04L 67/22 709/224 |
| 9,774,696 B1* | 9/2017 | Calvert | H04L 67/26 |
| 2013/0041753 A1* | 2/2013 | Sathyanath | G06Q 30/0261 705/14.58 |

(Continued)

OTHER PUBLICATIONS

Huerta, Juan The PlaceIQ analytic Platform: Location oriented approaches to mobile audiences (https://dl.acm.org/citation.cfm?id=2648588) Aug. 24, 2014, 5-5.4 (Year: 2014).*

(Continued)

*Primary Examiner* — James M Detweiler
*Assistant Examiner* — Alfred H Tsui
(74) *Attorney, Agent, or Firm* — Lowenstein Sandler LLP

(57) ABSTRACT

An audience matching system ("system") maintains a plurality of audience polygons that enclose respective geographic regions and are associated with respective time periods, and respective target audiences. The system receives an advertisement request from a remote display system having a display at a particular geographic location, the request including an advertisement parameter that identifies a first target time period. The system selects a first audience polygon from the plurality of audience polygons, the selecting based in part on a geographic region associated with the first audience polygon enclosing the geographic location of the display and a time period associated with the first audience polygon being inclusive of the first target time period. The system determines a first target audience using the first audience polygon, and selects an advertisement associated with the first target audience. The system provides the advertisement to the remote display system.

20 Claims, 8 Drawing Sheets

(56) References Cited

U.S. PATENT DOCUMENTS

| | | | |
|---|---|---|---|
| 2014/0122040 A1* | 5/2014 | Marti | G06F 17/5009 |
| | | | 703/6 |
| 2014/0280549 A1* | 9/2014 | Rajan | H04L 67/22 |
| | | | 709/204 |
| 2015/0170221 A1* | 6/2015 | Shah | G06Q 30/0275 |
| | | | 705/14.71 |

OTHER PUBLICATIONS

United States Office Action, U.S. Appl. No. 15,460,884, dated Apr. 21, 2017, 15 pages.
United States Office Action, U.S. Appl. No. 15/460,884, dated Nov. 3, 2017, 19 pages.

\* cited by examiner

| Record # | Device ID | Location ID | Record Time |
|---|---|---|---|
| 1 | Device 1 | [x1, y1] | RT1 |
| 2 | Device 2 | [x2, y2] | RT2 |
| 3 | Device 3 | [x3, y3] | RT3 |
| 4 | Device 4 | [x1, y4] | RT4 |
| ⋮ | ⋮ | ⋮ | ⋮ |
| 6 | Device 2 | [x5, y5] | RT4 |
| 7 | Device 1 | [x1, y1] | RT2 |
| 8 | Device 1 | [x1, y2] | RT4 |
| ⋮ | ⋮ | ⋮ | ⋮ | dataset (all records)

target audience condition

| Record # | Device ID | Location ID | Record Time | |
|---|---|---|---|---|
| 1 | Device 1 | [x1, y1] | RT1 | ← record satisfying condition |
| 2 | Device 2 | [x2, y2] | RT2 | |
| 3 | Device 3 | [x3, y3] | RT3 | |
| 4 | Device 4 | [x2, y4] | RT4 | ← dataset (all records) |
| ⋮ | ⋮ | ⋮ | ⋮ | |
| 6 | Device 2 | [x5, y5] | RT4 | |
| 7 | Device 1 | [x1, y1] | RT2 | |
| 8 | Device 1 | [x1, y2] | RT4 | |
| ⋮ | ⋮ | ⋮ | ⋮ | |
audience members → records 1, 4
FIGURE 3C
⇩ map audience member records at RT4
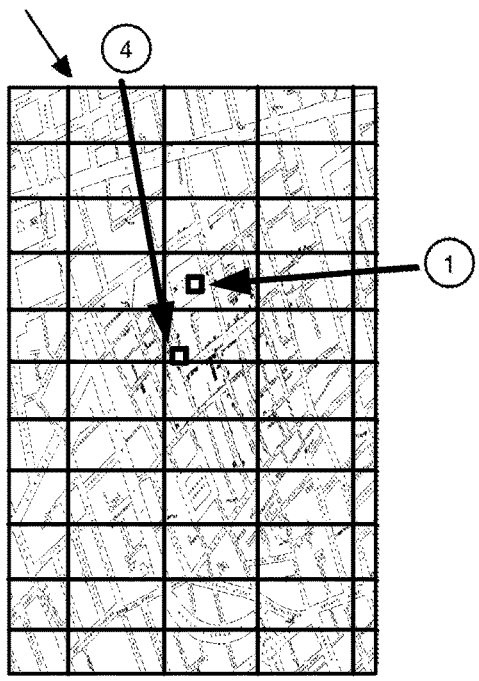
audience raster @RT4:
FIGURE 3D
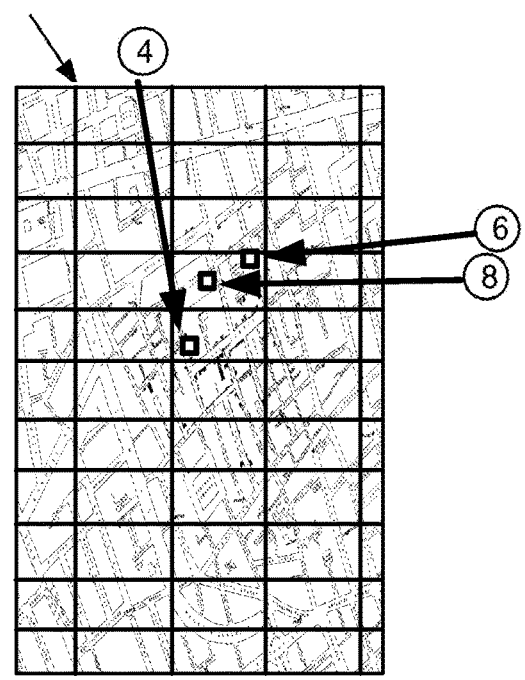
baseline raster @RT4:
FIGURE 3E baseline raster @RT4
for segments having an affinity
above a 75% affinity threshold Key merge
join audience polygon for RT4

AUDIENCE MATCHING SYSTEM FOR SERVING ADVERTISEMENTS TO DISPLAYS

CROSS-REFERENCE TO RELATED APPLICATIONS

This application claims the benefit of U.S. Provisional Application No. 62/001,238, filed May 21, 2014 and U.S. Provisional Application No. 62/038,739, filed Aug. 18, 2014, which are both incorporated by reference in their entirety.

TECHNICAL FIELD

This disclosure relates generally to the advertisement field, and more specifically to a new and useful display selection method in the advertisement field.

BACKGROUND

Businesses generally advertise their products and/or services at or near (e.g., within 20 feet) their brick and mortar stores. However, businesses also would like to advertise to their customers (or potential customers) at other locations, in a manner which has a high number of ad impressions with minimal cost. Conventionally, businesses identify these other locations by looking for areas where large numbers of people congregate (e.g., billboard at subway station). However, for a given location, demographics of an audience tend to vary with time and businesses do not have efficient ways to account for these changes in demographics to ensure that advertisements are being presented to the intended audience.

SUMMARY

The above and other needs are met by a computer-implemented method, a non-transitory computer-readable storage medium storing executable code, and a device for matching advertisements to target audiences.

One embodiment of the computer-implemented method for matching advertisements to target audiences, comprises maintaining a plurality of audience polygons, wherein each audience polygon encloses a respective geographic region and is associated with a respective time period, and a respective target audience. An advertisement request is received from a remote display system having a display at a particular geographic location, the request including an advertisement parameter that identifies a first target time period. A first audience polygon is selected from the plurality of audience polygons, the selecting based in part on a geographic region associated with the first audience polygon enclosing the geographic location of the display and a time period associated with the first audience polygon being inclusive of the first target time period. A first target audience is determined using the first audience polygon, and an advertisement associated with the first target audience is selected. The advertisement is provided to the remote display system.

In another embodiment a non-transitory computer-readable storage medium storing executable computer program instructions for matching advertisements to target audiences, comprises maintaining a plurality of audience polygons, wherein each audience polygon encloses a respective geographic region and is associated with a respective time period, and a respective target audience. An advertisement request is received from a remote display system having a display at a particular geographic location, the request including an advertisement parameter that identifies a first target time period. A first audience polygon is selected from the plurality of audience polygons, the selecting based in part on a geographic region associated with the first audience polygon enclosing the geographic location of the display and a time period associated with the first audience polygon being inclusive of the first target time period. A first target audience is determined using the first audience polygon, and an advertisement associated with the first target audience is selected. The advertisement is provided to the remote display system.

In yet another embodiment an audience matching system, that comprises a processor configured to execute instructions stored on a non-transitory computer-readable storage medium. The instructions when executed by a processor, cause the system to maintain a plurality of audience polygons, wherein each audience polygon encloses a respective geographic region and is associated with a respective time period, and a respective target audience. The system receives an advertisement request from a remote display system having a display at a particular geographic location, the request including an advertisement parameter that identifies a first target time period. The system selects a first audience polygon from the plurality of audience polygons, the selecting based in part on a geographic region associated with the first audience polygon enclosing the geographic location of the display and a time period associated with the first audience polygon being inclusive of the first target time period. The system determines a first target audience using the first audience polygon, and selects an advertisement associated with the first target audience. The system provides the advertisement to the remote display system.

BRIEF DESCRIPTION OF THE FIGURES

FIG. 3C is a schematic representation of a specific example of determining that device identifiers that have satisfied a target audience condition, according to an embodiment.

FIG. 3D is a schematic representation of a specific example of an audience raster at a given time, according to an embodiment.

FIG. 3E is a schematic representation of a specific example of a baseline raster at the given time, according to an embodiment.

DESCRIPTION OF THE PREFERRED EMBODIMENTS

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
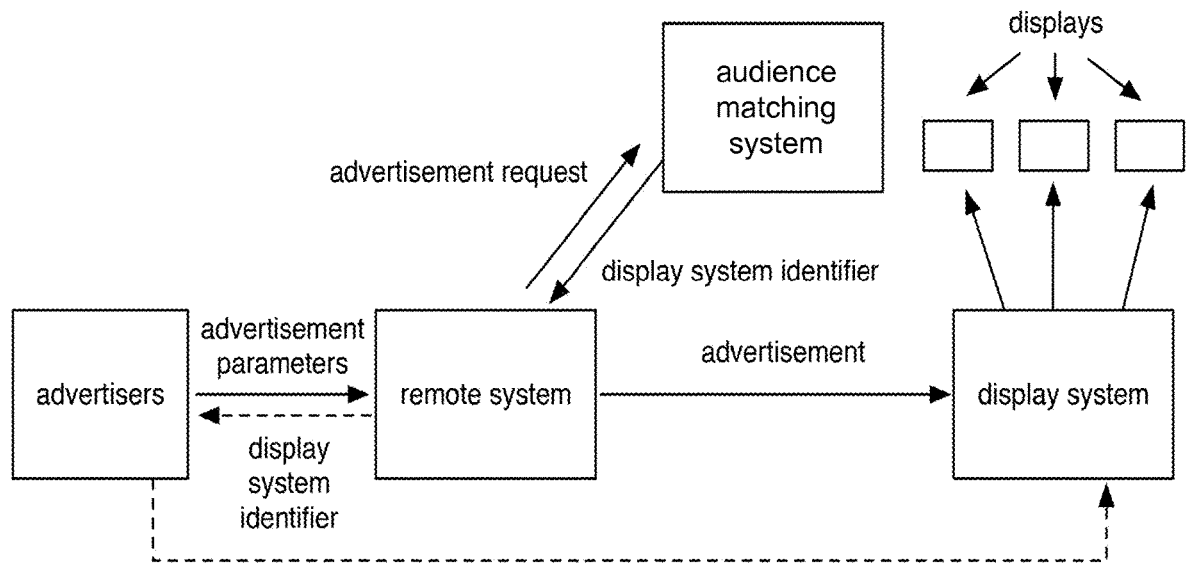
FIG. 1 is a schematic representation of a system and method for serving advertisements to displays, according to an embodiment.

FIG. 1 is a schematic representation of a system and method for serving advertisements to displays, according to an embodiment. As shown in FIG. 1, a method for serving advertisements to displays includes determining, by an audience matching system, audience polygons, wherein each audience polygon encloses a geographic region; receiving, by the audience matching system, an advertisement request from a remote system (e.g., advertisement exchange or advertiser); and selecting, by the audience matching system, an audience polygon for the advertisement request. Conversely, the method includes: in response to receipt at the audience matching system of an advertising request from a remote system associated with a display device, determining, by the audience matching system, the set of audience polygon(s) that the display device is located within; determining, by the audience matching system, one or more advertisement requests that request any of the audiences associated with the set of audience polygons; and sending, by the audience matching system, the advertisements associated with the determined advertisement requests to the remote system. The method functions to use location data for otherwise unknown users to determine when and where to display advertisements. The method functions to select an advertisement for presentation on a display device, wherein the display device is preferably a multi-user display device (e.g., a billboard), but can alternatively be a personal or single-user device (e.g., a mobile device), or any other suitable device (e.g., a display on a taxicab). The advertisement for presentation is preferably selected for an audience wherein the interests of the specific users viewing the advertisement are unknown, but can alternatively be selected for an audience wherein the interests of the specific user(s) is known (e.g., through a user profile or any other suitable user information repository).

Figure 2:
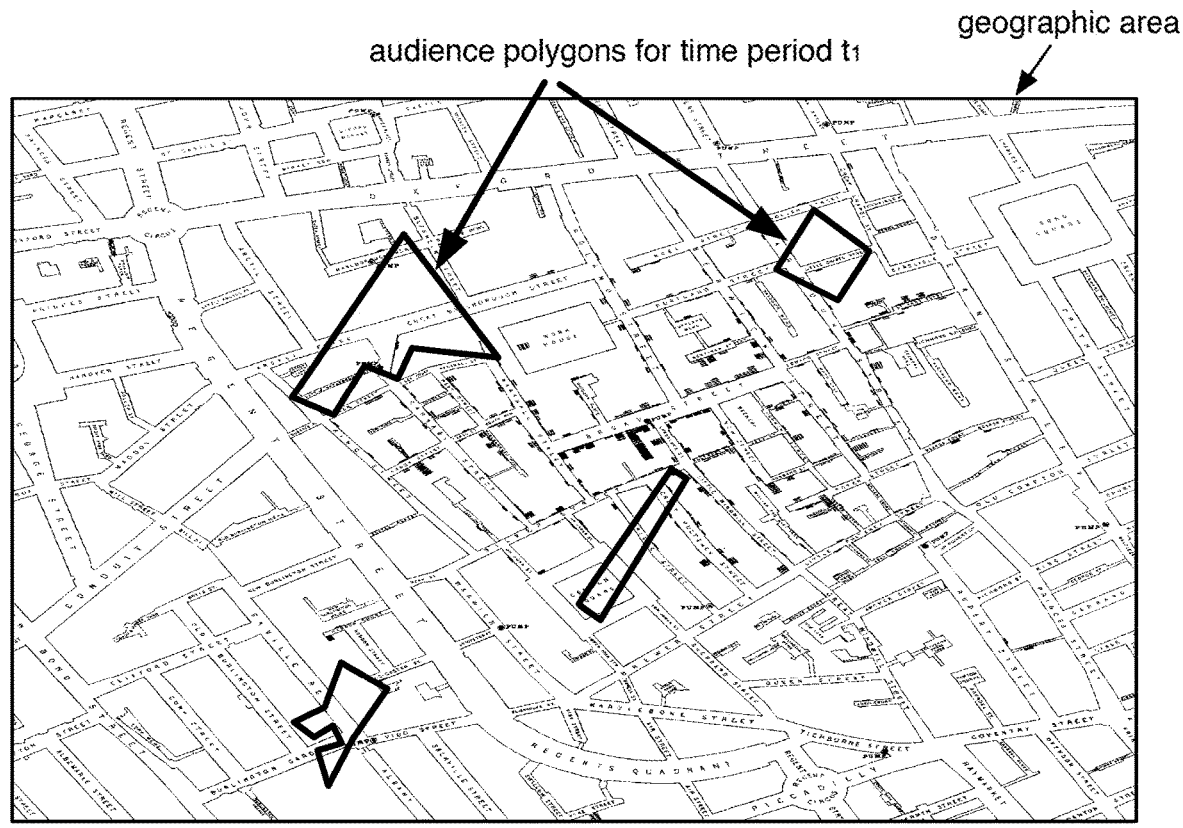
FIG. 2 is a specific example of audience polygons within a geographic area for a given time period.

As discussed below, an audience mapping system generates the audience polygons (also referred to as polygons). The generated audience polygons function to determine the geographic regions in which any member of the target audience is likely to be located at a given time. FIG. 2 is a specific example of audience polygons within a geographic area for a given time period. The audience polygons are preferably pre-generated, but can alternatively be generated in real time, generated in response to receipt of a new or updated dataset from a data source, periodically regenerated, checked, or updated, or generated at any other suitable frequency. The audience polygons are preferably generated by the audience matching system. In some embodiments, the audience matching system also matches and/or serves the advertisements. In alternate embodiments, some or all of the functionality of the audience matching system may be part of, e.g., a remote server or any other suitable computing system.

Each audience polygon is preferably associated with a geographic region, a target audience, and a time period. The audience polygon can additionally be associated with a threshold affinity (e.g., probability that people of the target audience will be within the polygon during the given time period). The geographic region is preferably the region in which the likelihood of a person satisfying the target audience condition is located is above a predetermined threshold, but can alternatively be any other suitable region. The target audience is preferably defined by a target audience condition. The target audience condition is preferably a historical location or pattern of locations, wherein each member of the target audience was close to the historical location or historically exhibited the pattern of locations at least once. However, the target audience condition can be a keyword associated with a historical location or pattern of locations, or be any other suitable filtering condition. A different audience polygon is preferably determined for each time period of a set of time periods. The time period set is preferably a set of predetermined, recurring time periods, but can alternatively be a unique time period (e.g., have a specific time and date, such as 4 pm-4:30 pm on 31 Mar. 2014). Each time period is preferably an hour of a day of the week (e.g., between 2 PM-3 PM on Mondays), but can alternatively have any other suitable interval (e.g., be per month, per day, per minute, per second) and occur at any other suitable frequency (e.g., daily, weekly, monthly, etc.). In one variation of the method, the time period set includes each hour of the week, such that 164 audience polygons are generated, one for each hour of the week. For example, the target audience condition can be "mothers," wherein the historical location proximity used to filter the device data is "within 10 meters of a toy store," the target audience is limited to devices that have been within 10 meters of a toy store, and the audience polygon encloses a geographic region that has more than a 75% probability that a mother (e.g., target audience members) will be within the geographic region at the given time period.

Figure 4:
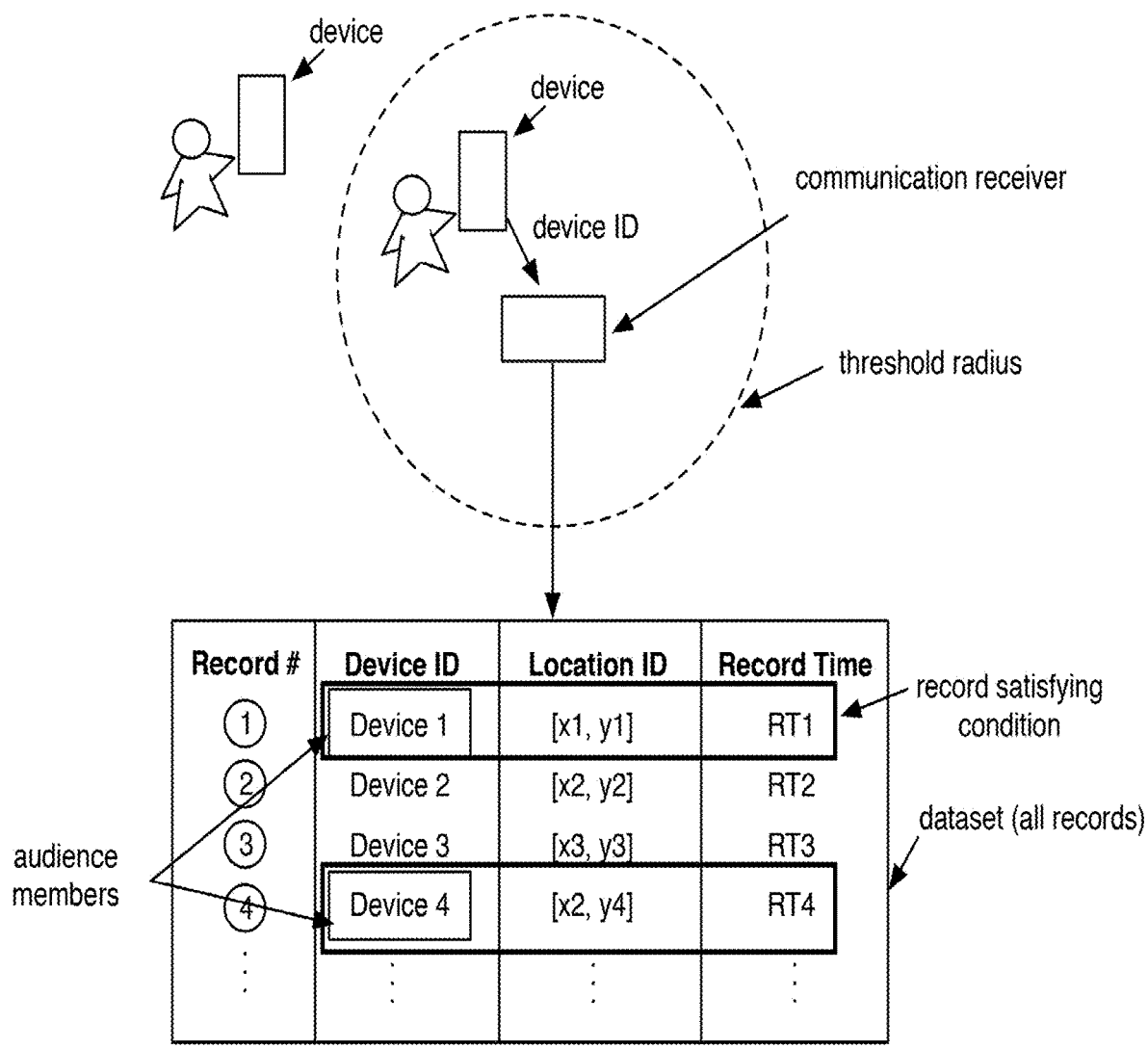
FIG. 4 is a schematic representation of recording a device identifier at a timestamp with a communication receiver, according to an embodiment.

The dataset used to generate the audience polygons preferably includes a plurality of records (e.g., data points), wherein each record includes at least a unique identifier, a timestamp, and a geographic identifier. The dataset is preferably aggregated or received from cell service providers, social networking systems (e.g., Facebook and Foursquare), mobile devices, or any other suitable source. The dataset can additionally or alternatively be received from near-field communication receivers, such as Bluetooth, NFC, iBeacon interaction, WiFi hotspot interaction, or other suitable communication receivers. For example, FIG. 4 is a schematic representation of recording a device identifier at a timestamp with a communication receiver, according to an embodiment. In operation, the communication receiver receives or detects a user identifier, emitted or otherwise received from a user device (e.g. smartphone) associated with the user, when the user device is within a threshold radius of the receiver. The communication receivers are preferably substantially static within a geographic location, but can alternatively be mobile. Data received from the communication receivers preferably include a unique user identifier and a timestamp at which the user identifier was received at the receiver, but can additionally or alternatively include other information. The unique identifier preferably functions to uniquely identify a user or device, such as a cell phone, tablet, or other mobile or mounted device. The unique identifier can be encoded or unencoded. The unique identifier can be a device identifier, a SIM card identifier, a phone number, an advertisement identifier, or any other suitable (e.g., consistent) identifier. The unique identifier is preferably not directly associated with a set or source of user interests (e.g., a social networking system, user profile, etc.) aside from the set of historical locations associated with the unique identifier within the dataset, such that the user associated with the unique identifier is generally unknown. However, the unique identifier can be directly or indirectly associated with a user profile or identifier stored within the remote system, a social networking system, or any other suitable system. The timestamp preferably includes a time, and can additionally include a date. The geographic identifier is preferably a set of latitude and longitude coordinates, but can alternatively be a political region name (e.g., a state name, a city name, a region name, etc.) or be any other suitable name. The geographic identifier is preferably used as received from the data source, but can alternatively be processed and made more accurate (e.g., such that the set of coordinates is closer to the true location of the device or user).

As noted above, each record of the dataset includes a unique identifier, a timestamp, and a geographic identifier. In some embodiments, one or more of the records may not include any personal identifying information of a user, and instead, the audience matching system infers characteristics of the users by comparing the timestamps and geographic identifiers to a set of rules to infer one or more characteristics of users of the devices. A rule is a set of geographic conditions, temporal conditions, or some combination thereof, that if met indicate one or more characteristics of a user. The rules are provided by an administrator of the audience matching system. For example, a first rule might be that devices located at elementary schools between 7:00 am and 8:30 am and/or between 3:00 pm and 4:30 pm during the work week indicate that the users of the devices are parents. A second rule might be that devices located at elementary schools during the work week for more than 3 hours are teachers or students. Additionally, combinations of rules may be used to further refine characteristics inferred about users. For example, a third rule that infers users are over 21 years of age if their associated devices are at a bar after 10:00 pm, combined with the second rule would indicate that the users are not students, but instead work at the school. Accordingly, by applying the rules to the records the audience matching system is able to infer characteristics about users of the devices without knowing the identity of the users.

The audience polygon is preferably generated by filtering the data (e.g., determined characteristics) with a target audience condition, segmenting the filtered data according to the set of time periods, generating an audience raster for the filtered data, and generating the audience polygon from the audience raster. As used herein, a raster is representative of a device distribution over a geographic area that has been subdivided into a plurality of sub-regions. Additionally, the device distribution may be filtered by target audience condition and/or time period. As discussed below with respect to FIG. 3E, a baseline raster is representative of the device distribution (e.g., all devices that there is a record of) over the geographic area for a given time period. In contrast, an audience raster is representative of the device distribution that meets a particular targeting audience condition (e.g., devices that are associated with users having an inferred characteristic that matches the target audience condition) over the geographic area for a given time period. For example, as discussed below FIG. 3D shows an audience raster at a particular time period RT4.

Figures 3A, 3B:
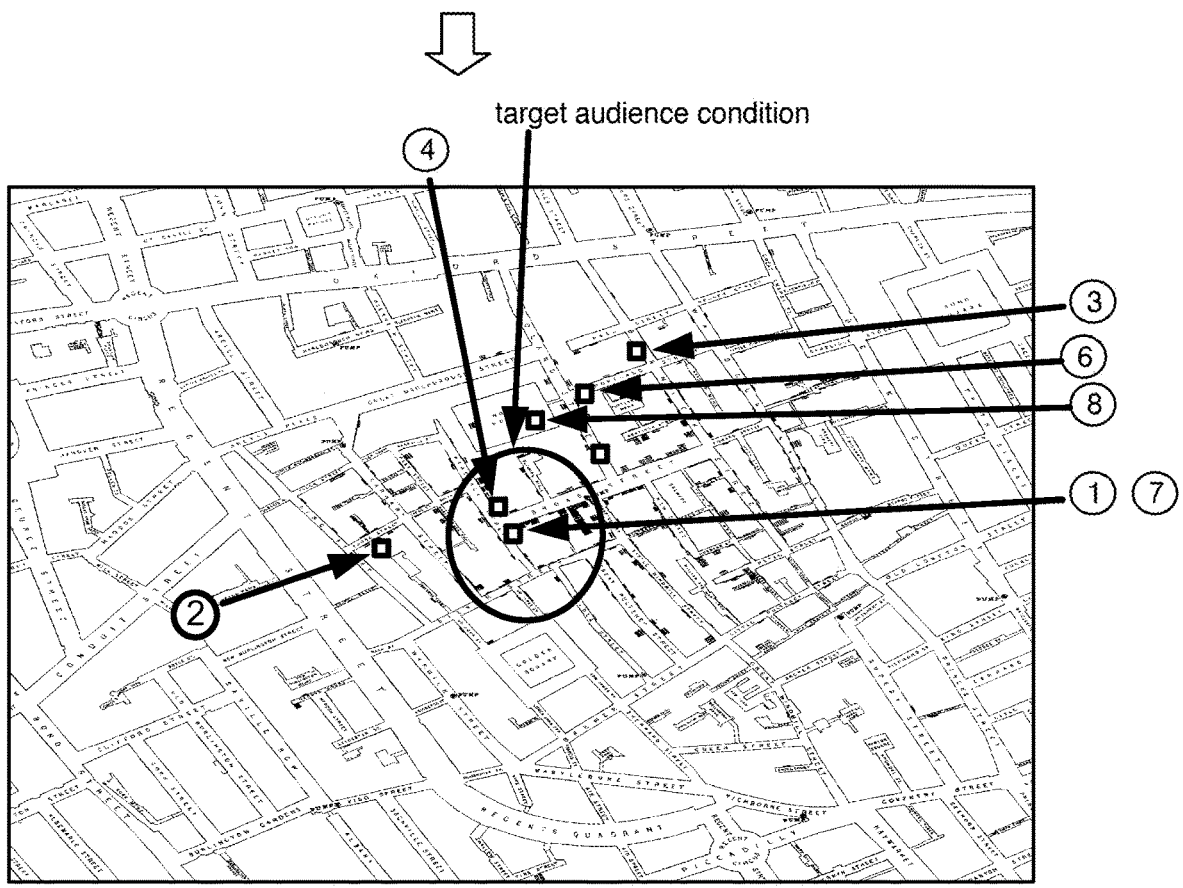
FIG. 3A is a schematic representation of a sample dataset, according to an embodiment.
FIG. 3B is a schematic representation of a specific example of determining which records satisfy a target audience condition, according to an embodiment.

Filtering the data with a target audience condition functions to identify the device identifiers that have satisfied the target audience condition at some point in time. The target audience condition is preferably one of a set of predetermined target audience conditions, but can alternatively be received from a third party (e.g., an advertiser). The target audience condition is preferably a threshold distance of a given set of locations (e.g., within 10 meters of any coffee shop, within 10 meters of a coffee shop, etc.), but can alternatively be a pattern of travel between a given set of locations (e.g., be within 20 meters of a coffee shop and within 10 meters of a toy store in the span of an hour), a keyword associated with a geographic proximity to a given set of locations or pattern, or be any other suitable target audience condition. FIG. 3A is a schematic representation of a sample dataset, according to an embodiment. FIG. 3B is a schematic representation of a specific example of determining which records satisfy the target audience condition, according to an embodiment. FIG. 3C is a schematic representation of a specific example of determining that device identifiers that have satisfied the target audience condition, according to an embodiment. Records satisfying the target audience conditions are preferably identified, as shown in FIGS. 3A and 3B, and the associated device identifiers identified, as shown in FIG. 3C. The data set is then filtered using the identified device identifiers to extract all location records that are associated with the identified device identifiers.

Segmenting the filtered data according to the set of time periods functions to organize the filtered data by time, such that the distribution of the devices across a geographical region for every given time period can be determined. The time period is preferably the time period for the audience polygon, but can alternatively be any other suitable time period. The time period preferably has a time interval. The time interval (e.g., duration of the time period) is preferably uniform (e.g., the same) for all time periods of the time period set, but can alternatively vary. The time interval is preferably an hour, but can alternatively be a minute, several minutes, several hours, a day, or any other suitable time interval. The time interval is preferably predetermined, but can alternatively be dynamically determined (e.g., based on an advertisement request, based on the frequency of advertisement requests, etc.). The time period is preferably a recurring time period, and can recur hourly (e.g., a minute of an hour), daily (e.g., an hour of the day), weekly (e.g., a week or hour of the week), monthly, yearly, biannually, or recur at any other suitable frequency. Examples of time periods can include seconds of a minute, seconds of an hour, seconds of a day, hours of a day, hours of the week (e.g., recurring weekly), days of the week (e.g., recurring weekly), a day of the year, months, years (e.g., year in a decade), or any other suitable recurring time period.

Generating an audience raster for the filtered data functions to determine the distribution of audience members within a geographic area for each given time period. The distribution of audience members is preferably relative to a baseline (e.g., where the remainder of the audience is), but can alternatively be relative to any other suitable reference value. The geographic area is preferably larger than and encompasses the geographic region associated with the audience polygon(s), but can alternatively be larger or smaller. The geographic area preferably encompasses all locations referenced by the filtered data, and more preferably encompasses all locations referenced by the dataset. However, the geographic area can only cover a subset of all locations referenced by the filtered data or the dataset. The geographic area is preferably the entire world (e.g., the surface of the planet), but can alternatively be a continent, a state, a city, or any other suitable politically or physically defined area. The audience raster preferably includes a set of geographic sub-regions and a number of audience members within each sub-region, but can additionally or alternatively be associated with any other suitable audience parameter. The audience raster is preferably generated using the filtered data, but can alternatively be generated using any other suitable data. An audience raster is preferably generated for each time period, but can alternatively be generated for the filtered data overall. The audience raster is preferably two-dimensional, but can alternatively be three-dimensional (e.g., accommodate for the geographic topology), or have any other suitable number of dimensions.

Generating the audience raster for a time period preferably includes dividing the geographic area into segments, mapping the filtered data for the time period to the geographic area, and determining the number of records within each segment, as shown in FIG. 3D which is a schematic representation of a specific example of an audience raster at a given time, according to an embodiment.

The segments of the raster are preferably discretized, non-overlapping, adjacent segments that each encompasses a geographic sub-region of the geographic area, wherein the sub-regions are preferably the sub-regions that the audience raster is associated with. The set of segments preferably cooperatively encompass the entirety of the geographic area, but can alternatively encompass a subset of the geographic area. The segments or sub-regions of the set are preferably uniform and have the same shape, encompass the same amount of geographic area, or encompass the same number of unique latitude and longitude coordinates. However, the segments of the raster can alternatively be overlapping, non-uniform, or have any other suitable property. The sizes of the segments are preferably predetermined, but can alternatively be automatically determined based on the number of records (e.g., overall or for the given time period), based on the desired resolution (e.g., meters or kilometers), or determined in any other suitable manner. For example, generating the segments of the raster can include dividing the geographic area into an array, or overlaying an array on the geographic area.

Mapping the filtered data for the time period to the geographic area includes mapping the device identifier or a representation thereof onto the segmented geographic area based on the location identifier for the record satisfying the time period. Different maps are preferably created for different time periods. Because the filtered data only includes the location records for device identifiers that had satisfied the target audience condition at some point in time (e.g., not necessarily the mapped record), mapping the filtered data for the time period results in the audience distribution across the geographic region for the given time period. The filtered data can be mapped before geographic area segmentation, after geographic area segmentation, or mapped at any other suitable time. For example, all filtered data records having a timestamp corresponding to the time period of 2 pm-3 pm on Tuesdays can be mapped to a first map (irrespective of month or year), while all filtered data records having a timestamp corresponding to the time period of 3 pm-4 pm on Tuesdays can be mapped to a second map (irrespective of month or year). Mapping the filtered data can additionally include filtering the records for each segment to eliminate redundant device identifiers (e.g., when the same device identifier appears in the segment multiple times for the given time period). However, the mapped filtered data can be otherwise processed.

Determining the number of audience records within each segment functions to determine the number of audience members or device identifiers in each segment. The number of records within each segment is preferably counted, but can be otherwise determined. The density of the audience members (e.g., number of audience members per geographic unit) or any other suitable audience location parameter can additionally be determined. For recurring time periods, the number of audience records within each segment can be determined by determining the mean, median, maximum, or any other suitable measure of the number of audience records across all instances of the time period. However, the number of audience records can be otherwise determined.

Determining the number of records within each segment can additionally include determining the maximum and minimum number of records within the segment for a given time period. This can be particularly applicable when the time periods are recurring. The maximum and minimum number of records can be determined across all instances of the given time period, determined across different instances of the time period, or determined in any suitable manner. For example, the maximum and minimum number of records can be determined for the general time period of 2 pm-3 pm on Tuesdays, wherein the maximum number of records (in aggregate, across all records of the time period) occurs at 2:14 pm, and the minimum number of records (in aggregate, across all records of the time period) occurs at 2:44 pm. In another example, the maximum and minimum number of records can be determined based on the individual instances having the maximum and minimum numbers. For example, the minimum number of records can be determined from a first instance of the time period of 2 pm-3 pm on Tuesdays occurring on 1 Apr. 2014, and the maximum number of records can be determined from a second instance of the time period of 2 pm-3 pm on Tuesdays occurring on 18 Mar. 2014.

Generating the audience polygon from the audience raster functions to delineate a geographic area in which the audience members are likely (e.g., beyond a threshold percentage likelihood) to be located within at the given time period.

In a first variation, the audience polygon is generated based on the audience member density, wherein generating the audience polygon can include determining the physical geographic boundaries that would result in a predetermined density of audience members. Physical geographic boundaries can include geographic features, such as mountain ranges, watercourses, coastlines, or any other suitable geographic feature. Physical geographic boundaries can additionally include manmade features, such as walls, gates, roads, or any other suitable man made barrier. The audience polygon can be automatically iteratively determined. For example, iteratively determining the audience polygon can include identifying a cluster of audience raster segments having audience member densities (or audience member numbers) above a predetermined threshold, identifying the physical geographic boundaries encircling the identified raster segment cluster, rasterizing the area encompassed within the physical geographic boundary, and selecting a second set of substantially continuous physical geographic boundaries that better encircle the desired density of audience members. The desired density (e.g., threshold density or threshold number) of audience members is preferably predetermined, but can alternatively be based on the advertisement request or determined in any other suitable manner. In the former instance, different audience polygons can be determined for the same geographic sub-region for the same time period, wherein each of the audience polygons is associated with a different threshold density level. For example, a first, second, and third audience polygon can be determined for a given geographic region, given time period, and given target audience, wherein the first audience polygon encircles a high audience density (e.g., 10 audience members per square meter), the second audience polygon encircles a medium audience density (e.g., 5 audience members per square meter), and the third audience polygon encircles a low audience density (e.g., 1 audience member per kilometer). The second audience polygon preferably encompasses the first audience polygon, and the third audience polygon preferably encompasses the second audience polygon, but the first, second, and third audience polygons can alternatively each cover different geographic points. Alternatively, the physical geographic boundaries can be manually determined or determined any other suitable manner.

In a second variation of the method, generating the audience polygon includes generating a set of line segments about a geographic area having a probability above a threshold probability of an audience member being located within the geographic area, merging the line segments, and joining the line segments. The resultant audience polygon is preferably one that encompasses (e.g., encircles or surrounds) a geographic area in which the probability that an audience member will be located within the geographic area at the given time is above a threshold probability.

Figure 3F:
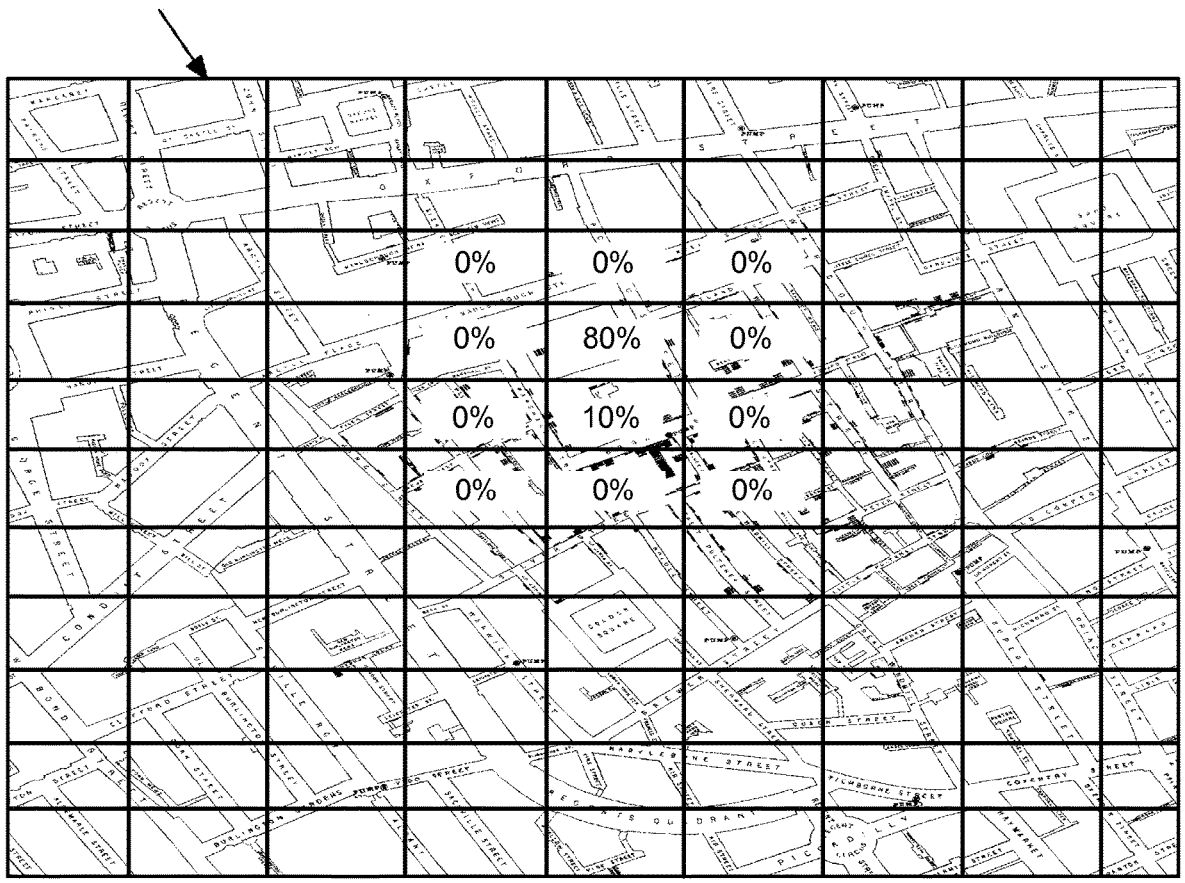
FIG. 3F is a schematic representation of a specific example of a normalized audience raster for the given time, according to an embodiment.
Figure 3G:
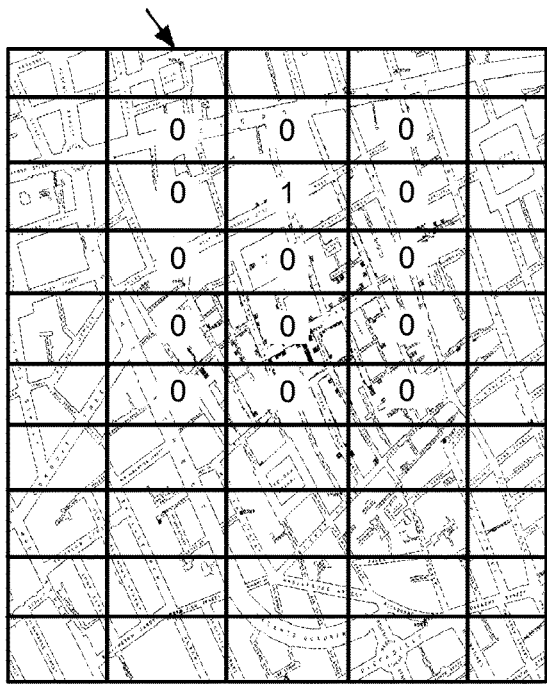
FIGS. 3G, 3H, 3J, and 3K are schematic representations of a specific example of a variation of generating the audience polygon, according to an embodiment.
Figure 3H:
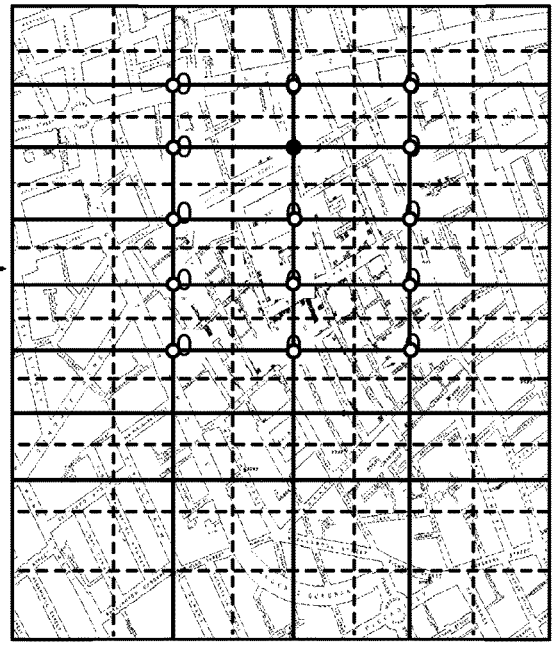
Figure 3J:
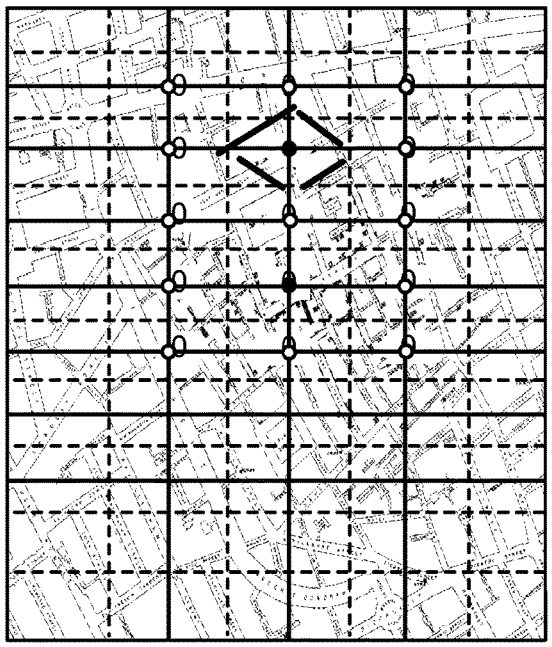
Figure 3K:
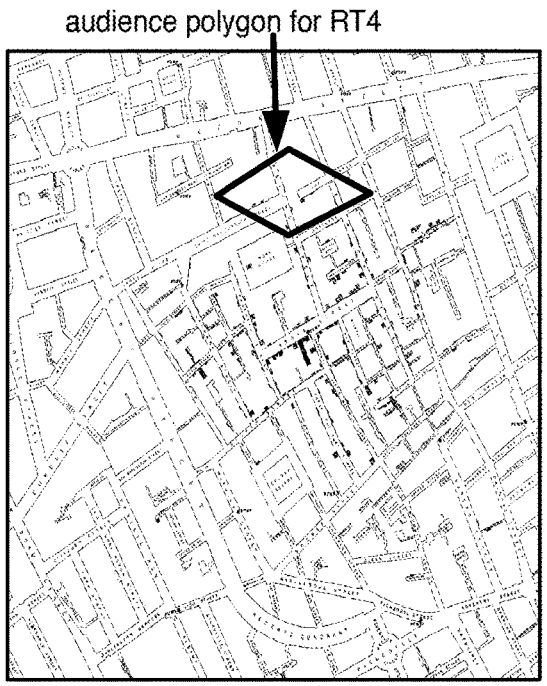

Generating the line segments preferably includes determining the probability that an audience member is within a geographic segment, relative to the rest of the population, as shown in FIG. 3F which is a schematic representation of a specific example of a normalized audience raster for the given time, according to an embodiment; and generating line segments based on the probability that the audience member is within the raster segment.

Determining the probability that an audience member is within a geographic segment preferably includes normalizing the number of audience members within a segment of the audience raster with a normalization value, but the probability can be determined in any other suitable manner. Alternatively, this can include determining how much the concentration of the audience within the geographic segment varies from the reference value. Alternatively, this can include dividing the audience raster by the baseline to obtain an actual probability of any sample being in the audience. One advantage of this embodiment is that there may be a lot of noise in both the baseline raster and the audience raster, and the division of the audience raster by the baseline effectively divides out the noise providing a relatively clean normalized audience raster. All or a portion of the calculated probabilities can be verified against a second data source (e.g., a Nielson number). The normalization value is preferably determined from the entire dataset, but can alternatively be determined from a subset of the dataset, predetermined, or determined in any other suitable manner. In one variation of the method, the normalization value is determined based on a baseline raster, as shown in FIG. 3E which is a schematic representation of a specific example of a baseline raster at the given time, according to an embodiment. A baseline raster is representative of the device distribution (e.g., all devices that there is a record of) over the geographic area that is subdivided into a plurality of sub-regions for a given time period. The baseline raster is preferably generated using all the data points of the dataset satisfying the time period, but can alternatively be generated using the entirety of the dataset, or any suitable portion of the dataset. The time period is preferably the same as that used to generate the audience raster but can alternatively be any other suitable time period. The baseline raster is preferably generated by dividing the geographic area (preferably the same geographic area as that used to generate the audience raster, alternatively a different geographic area) into discrete, non-overlapping raster segments (preferably the same segments as that of the audience raster but alternatively different segments), each associated with a geographic sub-region, that cooperatively cover the entirety of the geographic area. Alternatively, any other suitable raster segments can be used. The records satisfying the time period are then mapped to the geographic location indicated by the respective location identifier, similar to mapping the filtered data for the time period to the geographic area. The number of records within each baseline segment (e.g., within each sub-region) is preferably determined, similar to determining the number of audience records within each segment. The maximum and minimum number of baseline records within each baseline segment can additionally be determined, similar to determining the maximum and minimum number of audience records in each audience segment. The normalization value is preferably determined by dividing the maximum number of baseline records within a first raster segment (for a first time period) by the maximum number of audience records within the first raster segment (for the first time period). The probability that an audience member is within the first raster segment is preferably determined by multiplying the number of audience records in the first raster segment for the first time period with the normalization value and dividing the product by the baseline value for the first raster segment for the first time period. However, the probability that an audience member is within the first raster segment can be otherwise determined.

Generating the line segment based on the probability that the audience member is within the raster segment (audience probability) preferably includes generating a line segment for each geographic segment of the audience raster, but the line segments can be generated in any other suitable manner. Line segments are preferably generated within or along the audience raster segments that fall between a first geographic segment having an audience probability above a first probability threshold and a second geographic segment having an audience probability below a second probability threshold, or shares a boundary with a geographic segment having an audience probability above the first probability threshold or below the second probability threshold. The first probability threshold is preferably equivalent to the second probability threshold, but can alternatively be different. One or more sets of first and/or second probability thresholds can be used, wherein multiple audience polygons (e.g., sets of line segments) can be determined for each audience raster, wherein each audience polygon is preferably associated with a different probability that an audience member will be within the audience polygon (audience affinity). The number of sets and the thresholds can be predetermined, dynamically determined based on the advertisement request (e.g., extracted from the advertisement request), or determined in any other suitable manner. For example, if four thresholds are selected: above 0%, above 25%, above 50%, and above 75%, the method preferably generates the following sets of audience polygons, respectively: a first set of audience polygons surrounding geographic regions wherein more than 0% of the population satisfied the target audience condition, a second set of audience polygons surrounding geographic regions wherein more than 25% of the population satisfied the target audience condition, a third set of audience polygons surrounding geographic regions wherein more than 50% of the population satisfied the target audience condition, and a fourth set of audience polygons surrounding geographic regions wherein more than 75% of the population satisfied the target audience condition. However, the line segments can be generated based on any other suitable parameter The line segments are preferably generated for the audience raster segments using a marching squares method based on whether or not each audience raster segment satisfies the applied probability threshold, as shown in FIGS. 3G-3K which are schematic representations of a specific example of a variation of generating the audience polygon, according to an embodiment, but the line segments can alternatively be generated using any other suitable method. In one specific example, for given audience raster segment centered about the latitude and longitude coordinates of [39.59, −75.15] for a first time period, the baseline value is 553 unique devices, the audience value is 12 devices associated with the target audience condition, the normalization vector is 15.7, and the probability that a member of the audience is within the audience raster segment is 0.37%. The audience raster segment would be included within the geographic region enclosed by an audience polygon for the target audience condition and time period having a threshold probability (affinity) of 0%, would be included within the geographic region enclosed by an audience polygon for the target audience condition and time period having a threshold probability (affinity) of 25%, would not be included within the geographic region enclosed by an audience polygon for the target audience condition and time period having a threshold probability (affinity) of 50%, and would not be included within the geographic region enclosed by an audience polygon for the target audience condition and time period having a threshold probability (affinity) of 75%.

The line segments are preferably merged by combining the line segments, such as by using MapReduce's reduce function. However, contiguous or proximal line segments can be otherwise merged.

The merged line segments are preferably subsequently joined, such as by using MapReduce's reduce function. However, contiguous or proximal merged line segments can be otherwise joined. The resultant audience polygons are preferably then indexed and stored for advertisement querying, as shown in FIG. 3L which is a schematic representation of selecting the audience polygon based on the advertisement request, according to an embodiment.

Receiving an advertisement request from a remote system (e.g., advertisement exchange or advertiser) functions to trigger a system audience polygon query. The remote system may be part of an advertiser. In some embodiments, an advertiser may refer to an advertisement exchange. Receipt of an advertisement request can additionally or alternatively trigger audience polygon generation. The advertisement request preferably includes an audience parameter, a desired affinity, and an advertisement time. However, the advertisement request can additionally include other advertisement parameters, such as a desired geographic area or advertisement frequency, only include the audience parameter, or include any other suitable combination of audience parameters. The audience parameter can be a unique location (e.g., a latitude longitude coordinate), a venue category (e.g., coffee shops), a geographic distance from a venue category (e.g., within 10 meters of a coffee shop), a pattern of venues or unique locations, a persona or keyword, wherein the persona or keyword is associated with a geographic identifier such as a unique location or venue identifier by the audience matching system or advertiser (e.g., "mothers of young children," wherein the persona is associated with a pattern of visiting a coffee shop then a toy store within the same hour), or any be any other suitable audience parameter directly or indirectly associated with a geographic identifier. The probability received is preferably one of the sets of probability thresholds used to determine the audience polygons, but can alternatively be any other suitable probability, wherein the audience polygon for the received probability can be dynamically generated, or the audience polygon for the probability threshold higher than, lower than, or closest to the received probability can be used. For example, an advertisement request can include people who have been within 10 meters of a coffee shop, an 80% affinity, and a 3 pm time period, wherein the advertisement is to be shown at 3 pm in areas having more than 80% probability that someone who has been within 10 meters of any coffee shop. Alternatively, when an advertisement is received from the remote system, the audience matching system can extract one or more advertisement parameters, such as the time period, affinity, and/or target audience from the advertisement content (e.g., through keyword analysis, image analysis, cadence analysis, volume analysis, etc.).

Figure 3L:
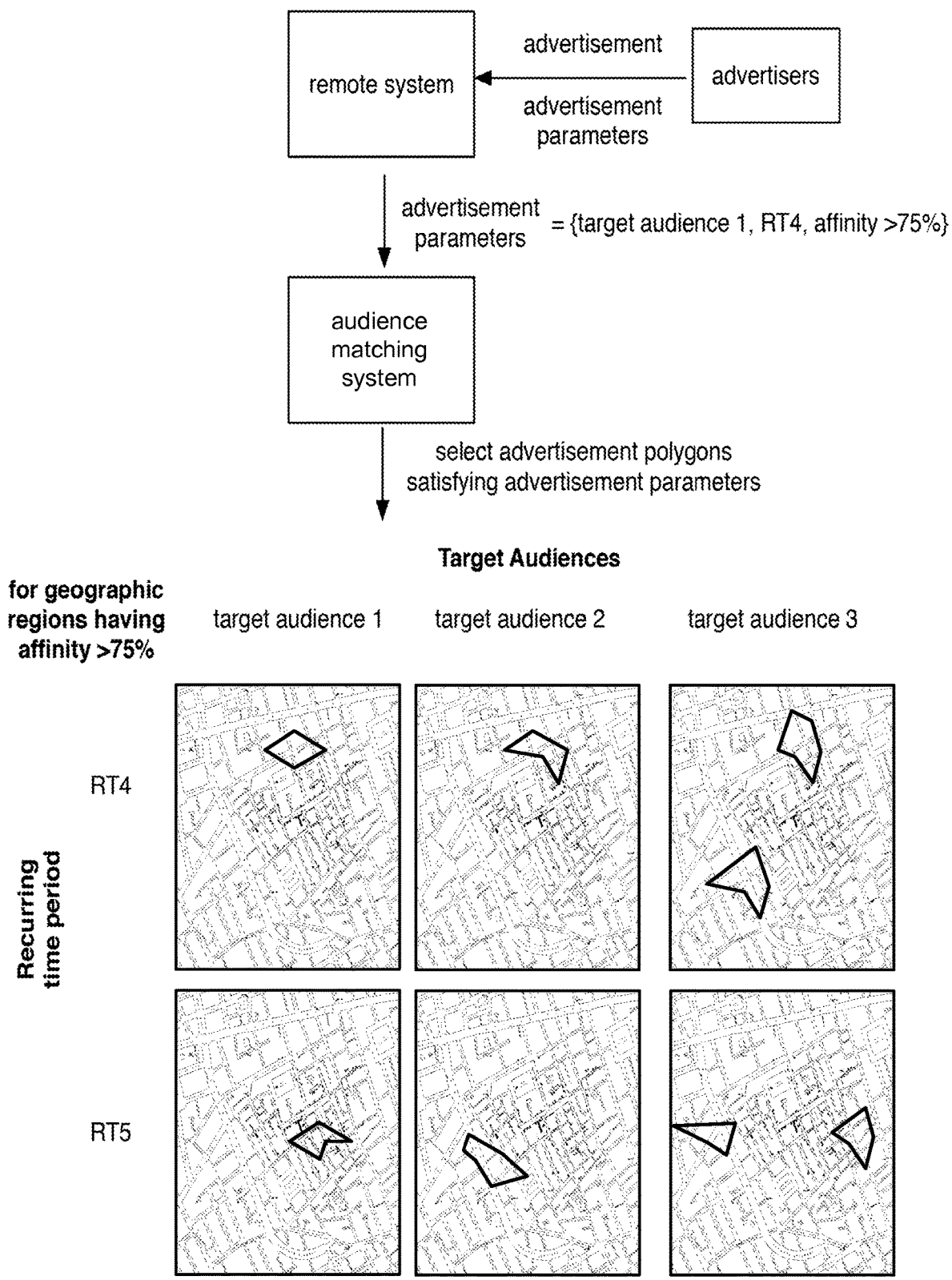
FIG. 3L is a schematic representation of selecting the audience polygon based on the advertisement request, according to an embodiment.

Selecting an audience polygon for the advertisement request functions to determine the geographic region in which a display device should be selected, as shown in FIG. 3L. The audience polygon that is selected is preferably for the audience parameter specified in the advertisement request, or for a target audience condition that is associated with the audience parameter (e.g., through natural language hierarchies, keyword association, etc.). The audience polygon that is selected preferably additionally satisfies the requested time period, wherein the audience polygon is preferably associated with a polygon time period that is the same as the requested time period, overlaps with the requested time period, or is encompassed within the requested time period. The audience polygon that is selected preferably additionally satisfies the requested affinity, wherein the audience polygon preferably encompasses a region having an audience affinity that matches or is higher than the requested affinity. However, the audience polygon can alternatively encompass a region having an audience affinity that is lower than the requested affinity. However, any other suitable set of audience polygons can be selected. A single audience polygon that best satisfies the requested parameters can be selected, or a set of audience polygons can be selected.

Figures 3M, 3N:
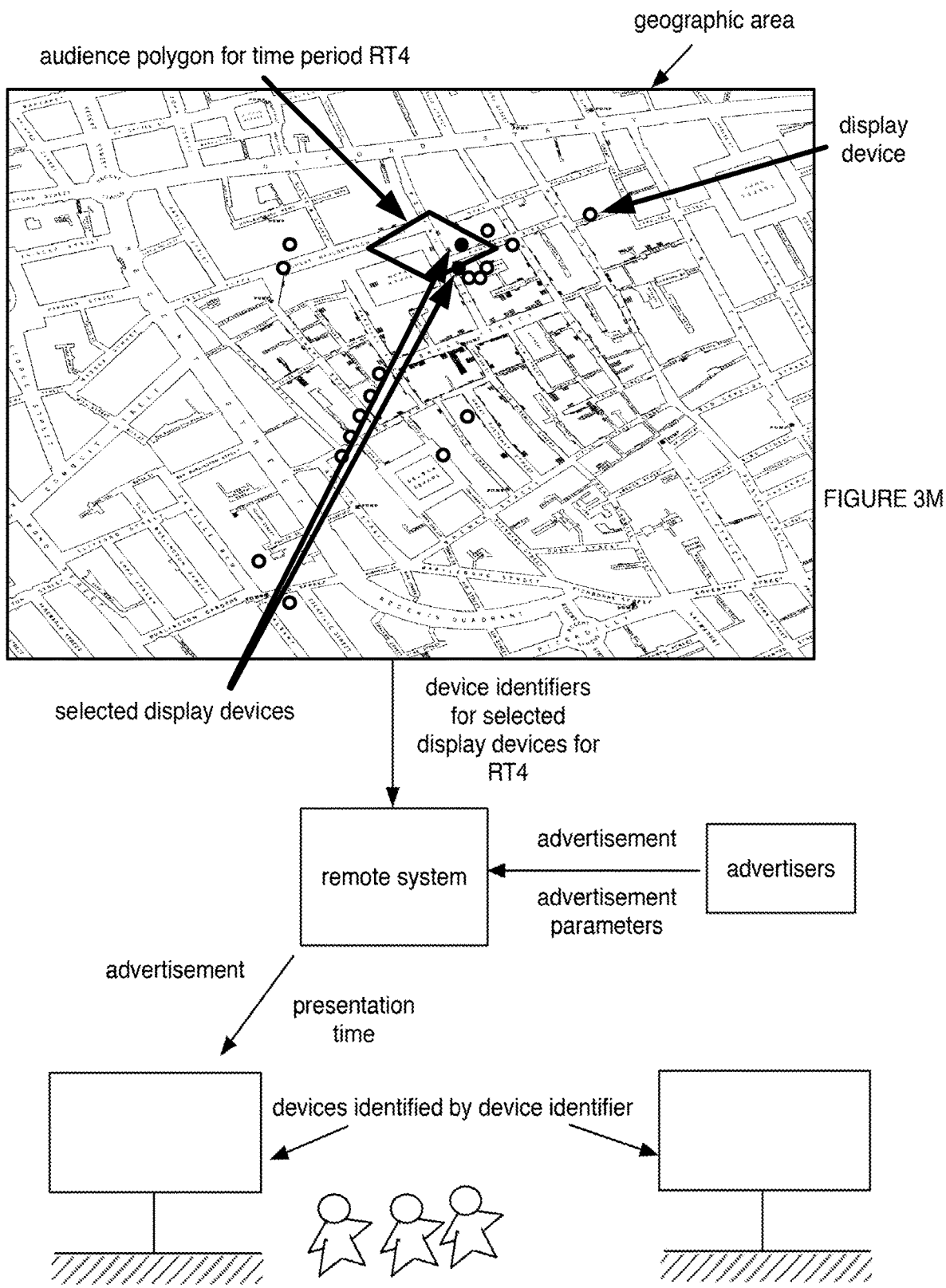
FIG. 3M is a specific example of identifying the display devices within the audience polygon, according to an embodiment.
FIG. 3N is a schematic representation of sending the device identifiers for the identified display devices to a remote system, according to an embodiment.

The method can additionally include identifying the display system identifier for a display physically located within the geographic region within the set of selected audience polygons, as shown in FIG. 3M which is a specific example of identifying the display devices within the audience polygon, according to an embodiment. The audience is preferably determined in response to a request to display the advertisement (e.g., at an advertisement display time), but can alternatively be predetermined for each advertisement. The display device is preferably statically mounted to a location within the geographic region, but can alternatively be mobile. The display device is preferably a public display, and is preferably capable of presenting an advertisement or any other suitable content to multiple users. The display is preferably a digital billboard, but can alternatively be a digital poster, array of televisions, or any other suitable statically mounted, multi-user display. However, the display can be the display of a personal mobile device, a vehicle, a static personal device, or any other suitable display. The display is preferably associated with a processing system that receives content, schedules content, and controls content rendering on the display. The processing system can additionally track the identifier of the content that is presented on the display, the frequency or number of times the content is presented, or any other suitable content parameter. Each display system can include one or more displays. The audience matching system can select identifiers for entire display systems, wherein a portion or the entirety of the display devices associated with the display system are located within the geographic region of the audience polygon, or select identifiers for individual display devices, wherein the individual display devices are preferably located within the geographic region of the audience polygon. However, any other suitable display device identifier or system identifier can be selected. The device location, device identifier, or system identifier is preferably sent to the remote server from which the advertisement request was received, as shown in FIG. 3N which is a schematic representation of sending the device identifiers for the identified display devices to a remote system, according to an embodiment. Alternatively, the information sent to the remote system can include the geographic locations of the display devices within the advertisement polygons, the display identifiers of the display devices within the advertisement polygons, the system identifiers (e.g., virtual addresses) associated with the identified display devices, or any other suitable information to the remote system. Alternatively, an advertisement can additionally be received in conjunction with the advertisement request, wherein the audience matching system can send the advertisement to the display devices located within the audience polygons that meet the advertisement request parameters. The advertisement or information is preferably wirelessly transmitted to the recipient, but can alternatively be transferred over a wired connection.

The method can additionally include scheduling advertisements, wherein the information sent to the remote server or display system preferably further includes a set of times for advertisement display. In one variation of the method, the advertisements or advertisement requests can have different priorities for a given audience polygon, wherein high priority advertisements can be shown first, shown longer, shown at higher frequencies, or have any other suitable presentation parameter. The priorities can be determined based on the bid price associated with the advertisement, the priority for the advertisement, received as part of the advertisement request, the order in which the associated advertisement request was received, the percentage match of the audience region or anticipated users within the audience region with the advertisement request, or determined in any other suitable manner.

The method can additionally include receiving confirmation of advertisement presentation. The confirmation can be a confirmation of advertisement display within the geographic region associated with the selected audience, confirmation of advertisement presentation on a display system located within the geographic region (e.g., a display identified by the audience matching system), or any other suitable confirmation. The confirmation can additionally include the number of times the advertisement was displayed, or any other suitable presentation parameter. The confirmation can be subsequently used to bill the advertiser. In response to receipt of payment from the advertiser, portions of the payment can be disbursed to the audience matching systems associated with the display devices based on the advertisement presentation duration, frequency, number of times, time period, or any other suitable advertisement display parameter. However, the confirmation can be otherwise used. The method can additionally or alternatively include any suitable combination of the aforementioned elements.

An alternative embodiment preferably implements the above methods in a computer-readable medium storing computer-readable instructions. The instructions are preferably executed by computer-executable components preferably integrated with an advertisement routing system. The advertising routing system may include an audience matching system. The audience matching system may include an audience polygon generation system that functions to generate one or more geofences enclosing geographic areas in which people satisfying a historic geographic condition have a high likelihood of being during a given time period, an advertisement request matching system that functions to match advertisement requests with a set of audience polygons, and an audience polygon reply system that functions to send an advertiser or advertisement exchange the locations, addresses, or identifiers of display systems within the region bounded by the selected audience polygons. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

An alternative embodiment preferably implements the above methods in a non-transitory computer-readable medium storing computer-readable instructions. The instructions are preferably executed by computer-executable components preferably integrated with a location correction system as described in detail in U.S. application Ser. No. 14/688,756, filed on Apr. 16, 2015, and which is hereby incorporated by reference in its entirety. The location correction system can include a cell region mapping system, probability determination system, and location selection system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for matching advertisements to audiences. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details disclosed herein.

The invention claimed is:

1. A computer-implemented method for matching advertisements to target audiences, comprising:
   receiving a target audience condition wherein the target audience condition includes a geographic location and a time period associated with a target audience;
   determining the target audience based on the target audience condition, the target audience comprising one or more audience members;
   receiving an advertisement request from a remote display system having a display at a particular geographic location, the request including an advertisement parameter that identifies a first target time period;
   filtering an aggregated dataset based on the received target audience condition;
   segmenting the filtered data according to a set of time periods;
   generating an audience raster based on the filtered data wherein the audience raster is representative of a distribution of a plurality of mobile devices that satisfy the received target audience condition over a plurality of sub-regions of the geographic area for a given one of the set of time periods;
   generating, based on the audience raster, a first audience polygon based on a set of line segments enclosing a geographic area wherein the one or more audience members have a probability above a threshold probability of being located within the geographic area;
   selecting an advertisement associated with the target audience; and providing the selected advertisement to the remote display system for presentation on the display at the particular geographic location during the first target time period.

2. The Computer-implemented method of claim 1, further comprising:
   receiving a data set including a plurality of records from one or more cell service providers that are associated with mobile device users, each record including a respective timestamp and geographic identifier; inferring a plurality of characteristics about one or more of the mobile device users by comparing timestamps and geographic identifiers in each record to a set of rules that map inferred characteristics to specific combinations of geographic and temporal conditions; and generating one or more audience polygons using the inferred plurality of characteristics.

3. The computer-implemented method of claim 2, wherein generating one or more audience polygons using the inferred plurality of characteristics, comprises: determining a baseline group of records in the data set having timestamps within a first time period; generating a baseline raster using the baseline group of records, the baseline raster describing a baseline distribution of mobile device users across a geographic region which is subdivided into a plurality of sub-regions; determining a subset of the baseline group of records that are associated with mobile device users that each have in common a first inferred characteristic of the inferred plurality of characteristics; generating a second audience raster using the subset of the baseline group of records, the second audience raster describing an audience distribution across the plurality of sub-regions for the mobile device users associated with the subset of the baseline group of records; generating a normalized audience raster using the audience raster and the baseline raster, the normalized audience raster describing a normalized audience distribution across the plurality of sub-regions and indicating affinities describing probabilities that mobile device users having the first characteristic are found within each of the plurality of sub-regions; and generating the one or more audience polygons using the normalized audience raster.

4. The computer-implemented method of claim 3, wherein generating the one or more audience polygons using the normalized audience raster comprises: identifying regions of the plurality of regions of the normalized audience raster that have different affinities; generating the one or more audience polygons using the identified regions, each audience polygon associated with the first time period and one of the different affinities; and storing the one or more audience polygons as part of the plurality of audience polygons.

5. The computer-implemented method of claim 1, wherein the display is statically mounted at the particular geographic location and is configured to present the advertisement to multiple members of the target audience.

6. The computer-implemented method of claim 1, wherein generating a first audience polygon based on a set of line segments comprises: determining the probability that the audience member is within a geographic segment associated with the first audience polygon relative to a population of audience members; and generating the set of line segments based on the probability that the audience member is within the geographic region associated with the set of line segments.

7. The computer-implemented method of claim 6, wherein determining the probability that the audience member is within the geographic location comprises normalizing a number of audience members within a segment of the audience raster with a normalization value.

8. A non-transitory computer-readable storage medium storing executable computer program instructions for method for matching advertisements to target audiences, the instructions executable to perform steps comprising:
   receiving a target audience condition wherein the target audience condition includes a geographic location and a time period associated with a target audience;
   determining the target audience based on the target audience condition, the target audience comprising one or more audience members;
   receiving an advertisement request from a remote display system having a display at a particular geographic location, the request including an advertisement parameter that identifies a first target time period;
   filtering an aggregated dataset based on the received target audience condition;
   segmenting the filtered data according to a set of time periods;
   generating an audience raster based on the filtered data wherein the audience raster is representative of a distribution of a plurality of mobile devices that satisfy the received target audience condition over a plurality of sub-regions of the geographic area for a given one of the set of time periods;
   generating, based on the audience raster, a first audience polygon based on a set of line segments enclosing a geographic area wherein the one or more audience members have a probability above a threshold probability of being located within the geographic area;
   selecting an advertisement associated with the target audience; and
   providing the selected advertisement to the remote display system for presentation on the display at the particular geographic location during the first target time period.

9. The computer-readable medium of claim 8, further comprising:
   receiving a data set including a plurality of records from one or more cell service providers that are associated with mobile device users, each record including a respective timestamp and geographic identifier; inferring a plurality of characteristics about one or more of the mobile device users by comparing timestamps and geographic identifiers in each record to a set of rules that map inferred characteristics to specific combinations of geographic and temporal conditions; and generating one or more audience polygons using the inferred plurality of characteristics.

10. The computer-readable medium of claim 9, wherein generating one or more audience polygons using the inferred plurality of characteristics, comprises: determining a baseline group of records in the data set having timestamps within a first time period; generating a baseline raster using the baseline group of records, the baseline raster describing a baseline distribution of mobile device users across a geographic region which is subdivided into a plurality of sub-regions; determining a subset of the baseline group of records that are associated with mobile device users that each have in common a first inferred characteristic of the inferred plurality of characteristics; generating a second audience raster using the subset of the baseline group of records, the second audience raster describing an audience distribution across the plurality of sub-regions for the mobile device users associated with the subset of the baseline group of records; generating a normalized audience raster using the second audience raster and the baseline raster, the normalized audience raster describing a normalized audience distribution across the plurality of sub-regions and indicating affinities describing probabilities that mobile device users having the first characteristic are found within each of the plurality of sub-regions; and generating the one or more audience polygons using the normalized audience raster.

11. The computer-readable medium of claim 10, wherein generating the one or more audience polygons using the normalized audience raster comprises: identifying regions of the plurality of regions of the normalized audience raster that have different affinities; generating the one or more audience polygons using the identified regions, each audience polygon associated with the first time period and one of the different affinities; and storing the one or more audience polygons as part of the plurality of audience polygons.

12. The computer-readable medium of claim 8, wherein generating a first audience polygon based on a set of line segments comprises: determining the probability that the audience member is within a geographic segment associated with the first audience polygon relative to a population of audience members; and generating the set of line segments based on the probability that the audience member is within the geographic region associated with the set of line segments.

13. The computer-readable medium of claim 12, wherein determining the probability that the audience member is within the geographic location comprises normalizing a number of audience members within a segment of the audience raster with a normalization value.

14. An audience matching system comprising: a processor; and a non-transitory computer-readable storage medium coupled to the processor, the computer-readable storage medium including instructions that, when executed by the processor, cause the system to perform steps comprising:
   receiving a target audience condition wherein the target audience condition includes a geographic location and a time period associated with a target audience;
   determining the target audience based on the target audience condition, the target audience comprising one or more audience members;
   receiving an advertisement request from a remote display system having a display at a particular geographic location, the request including an advertisement parameter that identifies a first target time period;
   filtering an aggregated dataset based on the received target audience condition;
   segmenting the filtered data according to a set of time periods;
   generating an audience raster based on the filtered data wherein the audience raster is representative of a distribution of a plurality of mobile devices that satisfy the received target audience condition over a plurality of sub-regions of the geographic area for a given one of the set of time periods;
   generating, based on the audience raster, a first audience polygon based on a set of line segments enclosing a geographic area wherein the one or more audience members have a probability above a threshold probability of being located within the geographic area;

selecting an advertisement associated with the target audience; and providing the selected advertisement to the remote display system for presentation on the display at the particular geographic location during the first target time period.

15. The system of claim 14, wherein the instructions, when executed by the processor, further cause the system to perform steps comprising: receiving a data set including a plurality of records from one or more cell service providers that are associated with mobile device users, each record including a respective timestamp and geographic identifier; inferring a plurality of characteristics about one or more of the mobile device users by comparing timestamps and geographic identifiers in each record to a set of rules that map inferred characteristics to specific combinations of geographic and temporal conditions; and generating one or more audience polygons using the inferred plurality of characteristics.

16. The system of claim 15, wherein generating one or more audience polygons using the inferred plurality of characteristics, comprises: determining a baseline group of records in the data set having timestamps within a first time period; generating a baseline raster using the baseline group of records, the baseline raster describing a baseline distribution of mobile device users across a geographic region which is subdivided into a plurality of sub-regions; determining a subset of the baseline group of records that are associated with mobile device users that each have in common a first inferred characteristic of the inferred plurality of characteristics; generating a second audience raster using the subset of the baseline group of records, the second audience raster describing an audience distribution across the plurality of sub-regions for the mobile device users associated with the subset of the baseline group of records; generating a normalized audience raster using the second audience raster and the baseline raster, the normalized audience raster describing a normalized audience distribution across the plurality of sub-regions and indicating affinities describing probabilities that mobile device users having the first characteristic are found within each of the plurality of sub-regions; and generating the one or more audience polygons using the normalized audience raster.

17. The system of claim 16, wherein generating the one or more audience polygons using the normalized audience raster comprises: identifying regions of the plurality of regions of the normalized audience raster that have different affinities; generating the one or more audience polygons using the identified regions, each audience polygon associated with the first time period and one of the different affinities; and storing the one or more audience polygons as part of the plurality of audience polygons.

18. The system of claim 14, wherein the display is statically mounted at the particular geographic location and is configured to present the advertisement to multiple members of the target audience.

19. The system of claim 14, wherein generating a first audience polygon based on a set of line segments comprises: determining the probability that the audience member is within a geographic segment associated with the first audience polygon relative to a population of audience members; and generating the set of line segments based the probability that the audience member is within the geographic region associated with the set of line segments.

20. The system of claim 19, wherein determining the probability that the audience member is within the geographic location comprises normalizing a number of audience members within a segment of the audience raster with a normalization value.

* * * * *